United States Patent Office 3,757,015
Patented Sept. 4, 1973

3,757,015
7-[D-(α-AMINO-α-PHENYL-, 2 - THIENYL- AND 3-THIENYL-ACETAMIDO] - 3 - [S-(2-METHYLTETRAZOLE - 5-YL)THIOMETHYL] - 3 - CEPHEM-4-CARBOXYLIC ACIDS
Leonard Bruce Crast, Jr., Clay, N.Y., assignor to Bristol-Myers Company, New York, N.Y.
No Drawing. Filed Mar. 27, 1972, Ser. No. 238,667
Int. Cl. C07d 99/24
U.S. Cl. 260—243 C                24 Claims

ABSTRACT OF THE DISCLOSURE

7-[D-(α-amino-α-phenyl-, 2-thienyl- and 3-thienyl-acetamido)]-3-[S-(2-methyltetrazole - 5 - yl)thiomethyl]-3-cephem-4-carboxylic acids and their nontoxic, pharmaceutically acceptable salts are valuable as antibacterial agents, as nutritional supplements in animal feeds, as agents for the treatment of mastitus in cattle and as therapeutic agents in poultry and animals, including man, and are especially useful in the treatment, particularly by oral administration, of infectious diseases caused by many Gram-positive and Gram-negative bacteria.

BACKGROUND OF THE INVENTION

(1) Field of the invention

The cephalosporins of the present invention possess the usual attributes of such compounds and are particularly useful in the treatment of bacterial infections by oral administration.

(2) Description of the prior art

Cephalothin and cephaloridine are well-known antibacterial agents; see U.S. Pats. 3,218,318; 3,449,338 and 3,498,979. The literature also contains considerable data on the activity of cephaloglycin and cephalexin; see U.S. Pats. 3,303,193 and 3,507,861 and Great Britain 985,747 and 1,054,806. Newer cephalosporins include cefazolin and cephapirin; see U.S. Pat. 3,516,997 [and also Netherlands 68/05179 (Farmdoc 34,328) and South Africa 68/4513] and U.S. Pat. 3,422,100.

The literature on cephalosporins has been reviewed by E. P. Abraham, Quart. Rev. (London) 21, 231 (1967) by E. Van Heyningen, Advan. Drug Res., 4, 1–70 (1967) and briefly in Annual Reports in Medicinal Chemistry, Academic Press, Inc., 111 Fifth Avenue, New York, New York, 10003, by L. C. Cheney on pages 96 and 97 (1967) and by K. Gerzon and R. B. Morin on pages 90–93 (1968) and by Gerzon on pages 79–80 (1969). New cephalosporins are frequently reported at the annual Interscience Conference on Antimicrobial Agents and Chemotherapy as illustrated by Sassiver et al., Antimicrobial Agents and Chemotherapy—1968, American Society for Microbiology, Bethesda, Md., pages 101–114 (1969) and by Nishida et al., ibid, 236–243 (1970). Two excellent recent reviews are The Cephalosporins Microbiological, Chemical and Pharmacological Properties and Use in Chemotherapy of Infection, L. Weinstein and K. Kaplan, Annals of Internal Medicine, 72, 729–739 (1970) and Structure Activity Relationships Among Semisynthetic Cephalosporins, M. L. Sassiver and A. Lewis, Advances in Applied Microbiology, edited by P. Perlman, 13, 163–236 (1970), Academic Press, New York.

The preparation of various 7-[α-amino-arylacetamido]-cephalosporanic acids and the corresponding desacetoxy compounds in which aryl represents unsubstituted or substituted phenyl or 2- or 3-thienyl is described, for example, in British specifications 985,747, 1,017,624, 1,054,806 and 1,123,333, in Belgium Pat. 696,026 (Farmdoc No. 29,494), in U.S. Pats. 3,311,621, 3,352,858, 3,489,750, 3,489,751, 3,489,752 and 3,518,260, in Japanese Pat. 16,871/66 (Farmdoc 23,231), by Spencer et al., J. Med. Chem., 9 (5), 746–750 (1966), by Ryan et al., J. Med. Chem. 12, 310–313 (1969) and by Kurita et al., J. Antibiotics (Tokyo) (A) 19, 243–249 (1966) and see also U.S. Pat. 3,485,819.

Netherlands Pats. 68/11676 (Farmdoc 36,349) and 68/12382 (Farmdoc 36,496) and U.S. Pats. 3,489,750 and 3,489,751 disclose ring-substituted cephaloglycins.

Various 7-[α-amino-arylacetamido]cephalosporins in which one hydrogen of the α-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. 3,364,212, Belgian Pat. 675,298 (Farmdoc 22,206), South African Pat. 67/1260 (Farmdoc 28,654) and Belgian Pat. 696,026 (Farmdoc 29,494). Related compounds include those of U.S. Pats. 3,303,193 and 3,311,621 and 3,518,260.

Various cephalosporins, including cephalosporin C on occasion but not cephaloglycin, have been reacted with nucleophilic, aromatic mercaptans to produce compounds having the structure

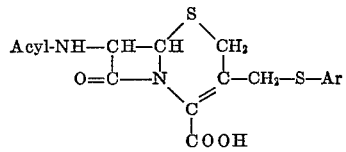

In U.S. Pat. 3,278,531 Ar is phenyl or certain substituted phenyls or certain aromatic heterocyclic rings named, for example, in column 5. Similar nuclophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for R3. Additional nucleophiles of this type were disclosed by Fujisawa in Belgian 714,518 (Farmdoc 35,-307; Netherlands 68/06129 and South Africa 2695/68), in Canada 818,501 (Farmdoc 38,845), in Great Britain 1,187,323 (Farmdoc 31,936; Netherlands 67/14888), in U.S. 3,530,123 and in U.S. 3,516,997 (Farmdoc 34,328; Netherlands 68/05179) which includes the compound named cefazolin, which has a tetrazolylacetyl sidechain on the 7-amino group and a 5 - methyl - thiadiazolylthiomethyl group at the 3-position and is described at some length in the scientific literature, e.g. in Antimicrobial Agents and Chemotherapy—1969, American Society for Microbiology, Bethesda, Maryland at pages 236–243 and in J. Antibiotics (Japan) 23(3), 131–148 (1970).

More recently, replacement of the 3-acetoxy group of a cephalosporin by various heterocyclic thiols has been disclosed in U.S. 3,563,983 and in Netherlands 70/05519 (Farmdoc 80,188R) where the sidechains were, for example, 7-α-aminophenylacetamido and typical heterocyclic thiols were 2-methyl-1,3,4-thiadiazole-5-thiol and 1-methyl-1,2,3,4-tetrazole-5-thiol; the latter corresponds to U.S. Pat. 3,641,021 issued Feb. 8, 1972 on an application filed Apr. 18, 1969.

Various cephalosporins having the structure

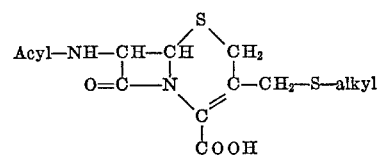

in which acyl represents various sidechains including α-aminophenylacetyl have been described in some of the above and by Glaxo in Belgium 734,532 (Farmdoc 41,-619) and in Belgium 734,533 (Farmdoc 41,620).

Cephalosporins having the structure

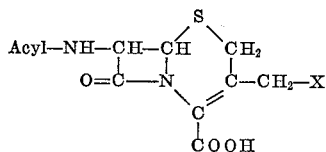

where X includes

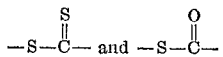

are disclosed in some of the above and in U.S. 3,239,515, 3,239,516, 3,243,435, 3,258,461, 3,431,259 and 3,446,803.

Related publications in the scientific literature include J. Med. Chem. 8, 174–181 (1965) and J. Chem. Soc. (London) 1595–1605 (1965), 5015–5031 (1965) and 1959–1963 (1967).

SUMMARY OF THE INVENTION

This invention comprises the amphoteric compound of the formula

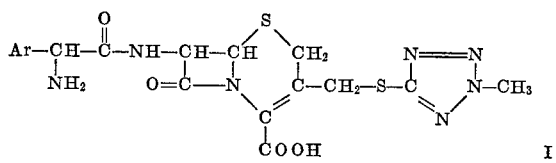

wherein Ar represents phenyl, 2-thienyl or 3-thienyl and having the D configuration and existing primarily as the zwitterion, and its nontoxic pharmaceutically acceptable salts.

Such salts include the nontoxic carboxylic acid salts thereof, including nontoxic metallic salts such as sodium, potassium calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)-alkylpiperidine, e.g., N-ethylpiperidine, and other amines which have been used to form salts with benzylpenicillin; and the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

The amphoteric compound of the present invention is prepared according to the present invention by coupling with 7-amino-3-[S-(2-methyltetrazole - 5 - yl)thiomethyl]-3-cephem-4-carboxylic acid (II) (or a salt or easily hydrolyzed ester thereof including those of U.S. Pat. 3,284,451 and any of the silyl esters described in U.S. Pat. 3,249,622 for use with 7-aminopenicillanic acid and used in Great Britain 1,073,530) a particular acid or its functional equivalent as an acylating agent for a primary amino group. After coupling, the blocking group is removed to give the desired product. Said acid has the formula

wherein Ar represents phenyl, 2-thienyl or 3-thienyl and wherein B represents a blocking group of the type used either in peptide syntheses or in any of the numerous synthesis of α-aminobenzylpenicillin from 2-phenylglycine.

Particularly valuable blocking groups are a proton, as in the compound of the formula

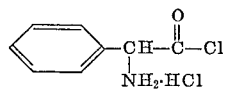

or a β-diketone as in Great Britain 1,123,333, e.g., methyl acetoacetate, in which case the acid containing the blocked amino group is preferably converted to a mixed anhydride, as with ethyl chloroformate, before reaction with Compound II or a salt thereof to form the desired product I after acid cleavage.

Further to the discussion above of blocking groups used on the free amino group of the sidechain acid during its coupling with Compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with Compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with Compound II after first reacting said free acid with N,N'-dimethylchloroformiminium chloride [cf. Great Britain 1,008,170 and Novak and Weichet, Experientia XXI, 6 360 (1965)] or by the use of enzymes or of an N,N'-carbonyldiimidazole or an N,N-carbonylditriazole [cf. South African patent specification 63/2684] or a carbodiimide reagent [especially N,N'-dicyclohexylcarbodiimide, N,N'-diisopropylcarbodiimide or N - cyclohexyl - N' - (2-morpholinoethyl)carbodiimide; cf. Sheehan and Hess, J. Amer. Chem. Soc., 77, 1067 (1955)], or of alkylylamine reagent [cf. R. Buijle and H. G. Viehe, Angew. Chem. International Edition 3, 582 (1964)], or of a ketenimine reagent [cf. C. L. Stevens and M. F. Mond, J. Amer. Chem. Soc., 80 (4065)] or of an isoxazolium salt reagent [cf. R. B. Woodwar, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolide. The by-product, imidazole, precipitates and may be separated and the imidazolide isolated, but this is not essential. The methods for carrying out these reactions to produce a cephalosphorin and the methods used to isolate the cephalosporin so produced are well known in the art.

In the treatment of bacterial infections in man, the compounds of this invention are administered orally or parenterally, in accordance with conventional procedures for antibotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions or as solids in tablets or capsules.

5-mercapto-2-methyl tetrazole

Preparation via:

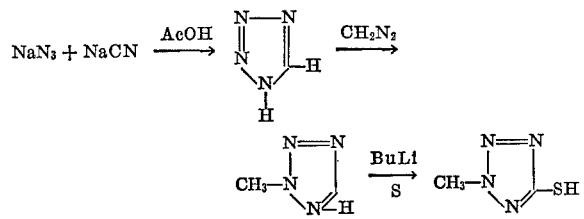

5-mercapto-2-methyl tetrazole (1) Tetrazole.—The original synthesis of A. Catino [Ann. Chim. (Rome), 56 (11), 1332–8 (1966)] was modified as follows:

A mixture of sodium azide (23.8 g., 368 mmoles) and sodium cyanide (17.5 g., 357 mmoles) in 70% ethanol (310 ml.) was flushed with nitrogen for 5 min. Acetic acid (37.5 ml.) was added and the mixture was heated at 135° for 24 hours in a stainless steel bomb (500 ml.). After completion of the reaction, most of the ethanol was removed in vacuo and the solution was acidified to pH 1 with conc. hydrochloric acid. The mixture was evaporated to dryness. The residual solid was extracted with hot ethyl acetate (3 × 250 ml.). The extracts were dried over $MgSO_4$ and the solvent removed in vacuo to leave a residue of crude tetrazole (23.4 g.) M.P. 149–154° (lit. 155°).

(2) 2-methyl-tetrazole.—Reaction of tetrazole with diazomethane was found to give higher yields of 2-methyltetrazole than the alkylation with dimethyl sulfate described by O. Gryskiewicz-Trochimowsky, Compt. rend., 246, 2627–9 (1958).

Tetrazole (crude residue as above) (55.3 g., 789 mmoles) dissolved in acetone (150 ml.) was treated with an excess of diazomethane in ether. Evaporation of the solvent left a light oil (64.0 g.). Fractional distillation afforded 2-methyltetrazole, B.P. 42–49°/13 mm., 28.3 g., 42.7%.

(3) 5-mercapto-2-methyl tetrazole.—This compound is not reported in Chem. Abst. 2-methyltetrazole (15.12 g., 180 mmoles) was added dropwise to a solution of butyl lithium in hexane (113 ml. of 1.6 N BuLi; 180 mmoles) and tetrahydorfuran (THF) (300 ml.) cooled to −70°. The mixture was stirred at that temperature for 20 min. and then sulfur (6.35 g., 198 mmoles) was added all at once. The mixture was stirred at −70° for an additional hour and allowed to come to room temperature. All the above operations were done under nitrogen. The reaction mixture was poured into cold water, extracted with ether, acidified to pH 6–5 with conc. hydrochloric acid and again extracted with ether to remove the precipitated sulfur. The aqueous layer was acidified with conc. hydrochloric acid (12 ml.) and extracted with chloroform. The organic extracts were dried over anh. $MgSO_4$ and the filtrates concentrated in vacuo to give the crude thiol (15.2 g.). Distillation yielded the pure 5-mercapto-2-methyltetrazole, B.P. 68–70°/2 mm. (64%, 13.4 g.).

Calcd. for $C_2H_4N_4S$ (percent): C, 20.68; H, 3.47; N, 48.24. Found (percent): C, 20.84; H, 3.42; N, 48.36.

7-amino-3-(2-methyltetrazole-5-yl)thiomethyl-3-cephem-4-carboxylic acid

To a stirred slurry of 27.2 g. (0.1 mole) of 7–ACA in 350 ml. of 0.1 M (pH 6.4) phosphate buffer, was added 16.8 g. (0.2 mole) of $NaHCO_3$ and 11.6 g. (0.1 mole) of 5-mercapto-2-methyltetrazole. The mixture was heated at 55° C. for four hours under a nitrogen atmosphere and then acidified to pH 5.9 with 40% $H_3PO_4$. After stirring for 30 min. with the heat removed, the crystalline product was collected by filtration and washed with water and then acetone to give, after drying over $P_2O_5$ at 1 mm. Hg, 12.9 g. 7-amino-3-(2-methyltetrazole-5-yl)thiomethyl-3-cephem-4-carboxylic acid, dec. pt. 200° C. The IR and NMR spectra were well defined and entirely consistent with the desired structure.

Analysis.—Calcd. for $C_{10}H_{12}N_6O_3S_2$ (percent): C, 36.58; H, 3.66; N, 25.61. Found (percent): C, 36.05; H, 3.67; N, 24.16.

The following examples are given in illustration of, but not in limitation of, the present invention. All temperatures are in degrees centigrade. 7-aminocephalosporanic acid is abbreviated as 7–ACA and methyl isobutyl ketone as MIBK. "Skellysolve B" is a petroleum ether fraction of B.P. 60–68° C. consisting essentially of n-hexane.

EXAMPLE 1

7-[α-D-(−)-amino-α-phenylacetamido] - 3 - (2 - methyltetrazole-5-yl)thiomethyl-3-cephem - 4 - carboxylic acid hydrate To a stirred suspension of 12.8 g. (0.039 mole) of 7-amino-3-(2-methyltetrazole-5-yl)thiomethyl - 3 - cephem-4-carboxylic acid in 150 ml. of methylene chloride was added 9.8 ml. (0.07 mole) of triethylamine and 7 ml. of N,N-dimethylaniline. Next, with cooling at 4° C., was added 10.2 ml. (0.08 mole) of chlorotrimethylsilane. After 15 min., the mixture was refluxed 30 min., cooled to 5° C. and 10 g. (0.046 mole) of D-(−)-α-phenylglycine acid chloride hydrochloride was added and the mixture stirred at 10° C. to 12° C. for two hours. To this solution was then added 150 ml. of water, with vigorous stirring, followed by addition of 20% NaOH to pH 1.8. The aqueous phase was separated and stirred with 4 g. of decolorizing carbon ("Darko KB"), filtered and the filtrate adjusted to pH 4 under a layer of 200 ml. of ether. The product was collected by filtration and washed with water and acetone to give 3 g. of 7-[α-D-(−)-amino-α-phenylacetamido]-3-(2 - methyltetrazole-5-yl)thiomethyl-3-cephem-4-carboxylic acid hydrates as amorphous white powder. The filtrate (excluding the washes) was stirred under fresh ether for an hour and a second crop of 7-[α-D-(−)-amino-α-phenylacetamido] - 3 - (2 - methyltetrazole-5-yl)thiomethyl-3-cephem-4-carboxylic acid hydrate, 2.45 g. dec. pt. 146° C., was collected. A third crop, 260 mg. was obtained by removing the acetone, in vacuo, from the acetone and water washed. All three crops had identical IR spectra. Only the second crop was used for testing and sent for IR, NMR and elemental analysis. The IR and NMR spectra of this sample was entirely consistent with the desired structure.

Analysis.—Calcd. for $C_{18}H_{19}N_7O_4S_2 \cdot H_2O$ (percent): C, 45.98; H, 4.51; N, 20.84. Found (percent): C, 45.96; H, 4.53; N, 20.04.

This sample of 7-[D-(α-amino-α-phenylacetamido)]-3-[S-(2-methyltetrazole-5-yl)-thiomethyl] - 3 - cephem-4-carboxylic acid (called New Compound) after solution in water at 2 mgm./ml. followed by dilution with Nutrient Broth was found to exhibit the following Minimum Inhibitory Concentrations (M.I.C.) in mcg./ml. versus the indicated microorganisms as determined by overnight incubation at 37° C. by Tube Dilution. Results with two old, orally absorbed cephalosporins are also given.

TABLE 1
[M.I.C. in mcg./ml.]

| Organism | | New compound | Cepha-lexin | Cephalo-glycin |
|---|---|---|---|---|
| D. pneumoniae plus 5% serum* | A9585 | .08 | .16 | .03 |
| Str. pyrgenes plus 5% serum* | A9604 | .08 | .16 | .03 |
| S. aureus Smith‡ | A9537 | .6 | .6 | .6 |
| S. aureus Smith‡ plus 50% serum | A9537 | 8 | 2.5 | 2.5 |
| S. aureus BX1633-2 at $10^{-3}$ dilution | A9606 | .6 | 2 | .6 |
| S. aureus BX1633-2 at $10^{-2}$ dilution | A9606 | 1 | 4 | .6 |
| S. aureus meth.-resistant | A15097 | 8 | 32 | 4 |
| S. aureus Smith at $10^{-3}$ dilution | A9748 | 8 | 32 | 4 |
| S. aureus Smith at $10^{-2}$ dilution | A9748 | 16 | 125 | 16 |
| Sal. enteritidis‡ | A9531 | .3 | 4 | .3 |
| E. coli Juhl‡ | A15119 | 4 | 8 | 1 |
| E. coli‡ | A9675 | 16 | 16 | 4 |
| K. pneumoniae‡ | A9977 | 2 | 4 | .6 |
| K. pneumoniae‡ | A15130 | 16 | 16 | 2 |
| Pr. mirabilis‡ | A9900 | 2 | 4 | .6 |
| Pr. morganii‡ | A15153 | 125 | >125 | 63 |
| $P_3$. aeruginosa‡ | A9843A | >125 | >125 | >125 |
| Ser. marcescens‡ | A20019 | >125 | >125 | >125 |

*50% nutrient broth, 45% antibiotic assay broth.
‡Adt $10^{-4}$ ilution.

Blood levels in the mouse after oral administration were determined with the following results:

| | Dose, mgm./kg. | Blood level in mcg./, hours after administration of dose— | | | |
|---|---|---|---|---|---|
| | | 0.5 | 1 | 2 | 3.5 |
| R= $-S-C\overset{N=N}{\underset{N}{\big|}}N-CH_3$ (structure shown) | 100 | 22.9 | 17.5 | 6.0 | 0.6 |
| H (cephalexin monohydrate) | 100 | 47.8 | 25.4 | 4.9 | 0.9 |

EXAMPLE 2

Sodium 7-[D-(α-amino-α-phenylacetamido)] - 3 - [S-(2-methyltetrazole-5-yl)-thiomethyl]-3-cephem - 4 - carboxylate To a stirred aqueous suspension of the zwitterionic form of 7-[D-(α-amino-α-phenylacetamido)] - 3 - [S-(2-methyltetrazole-5-yl)methyl]-3-cephem-4-carboxylic acid (0.8 mmole) is added 1 N aqueous sodium hydroxide at room temperature until a clear solution (pH 10.8) is obtained. This solution is immediately freeze-dried to give impure, solid sodium 7-[D - (α - amino - α - phenylacetamido)]-3-[S-(2-methyltetrazole - 5 - yl)-thiomethyl]-3-cephem-4-carboxylate.

EXAMPLE 3

7 - [D - (—) - α - amino - α - (3 - thienyl - acetamido] - 3-[S - (2 - methyltetrazole - 5 - yl) - thiomethyl] - 3-cephem-4-carboxylic acid This compound is prepared by following the procedure of Example 1 except that an equimolar weight of D-(—)-α-amino-α-(3-thienyl)-acetyl chloride hydrochloride is used instead of the D-(—)-2-phenylglycine acid chloride hydrochloride, which is also named D-(—)-α-aminophenylacetyl chloride hydrochloride.

EXAMPLE 4

7 - (D - (—) - α - amino - α - (2 - thienyl) - acetamido]-3 - [S - (2 - methyltetrazole - 5 - yl) - thiomethyl] - 3-cephem-4-carboxylic acid This compound is prepared by following the procedure of Example 1 except that an equimolar weight of D-(—)-α-amino-α-(2-thienyl)-acetyl chloride hydrochloride is used instead of the D-(—)-2-phenylglycine acid chloride hydrochloride, which is also named D-(—)-α-aminophenylacetyl chloride hydrochloride.

I claim:

1. The compound having the D configuration in the sidechain of the formula

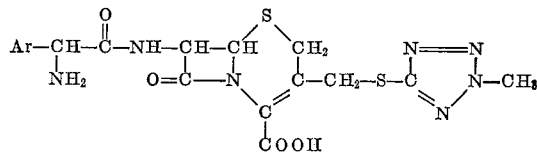

wherein Ar represents phenyl, 2-thienyl or 3-thienyl or a nontoxic, pharmaceutically acceptable salt thereof.

2. The compound having the D configuration in the sidechain of the formula

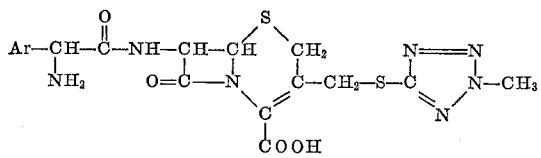

wherein Ar repersents phenyl, 2-thienyl or 3-thienyl.

3. The sodium salt of the compound of claim 2.
4. The potassium salt of the compound of claim 2.
5. The zwitterion form of the compound of claim 2.
6. A nontoxic, pharmaceutically acceptable acid addition salt of the compound of claim 2.
7. The compound of claim 1 having the D configuration in the sidechain of the formula

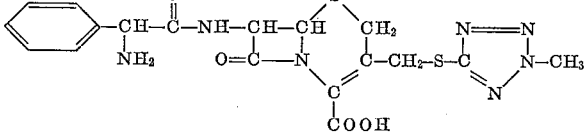

or a nontoxic, pharmaceutically acceptable salt thereof.

8. The compound of claim 2 having the D configuration in the sidechain of the formula

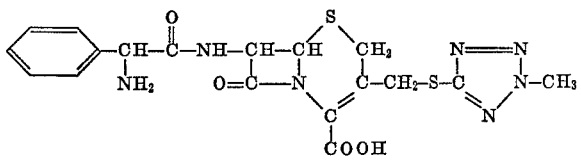

9. The sodium salt of the compound of claim 8.
10. The potassium salt of the compound of claim 8.
11. The zwitterion form of the compound of claim 8.
12. A nontoxic, pharamaceutically acceptable acid addition salt of the compound of claim 8.
13. The compound of claim 1 having the D configuration in the sidechain of the formula

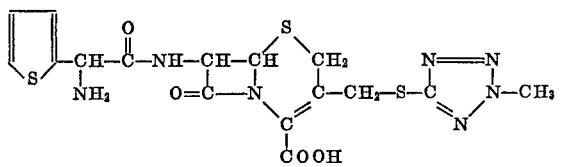

or a nontoxic, pharmaceutically acceptable salt thereof.
14. The compound of claim 2 having the D configuration in the sidechain of the formula

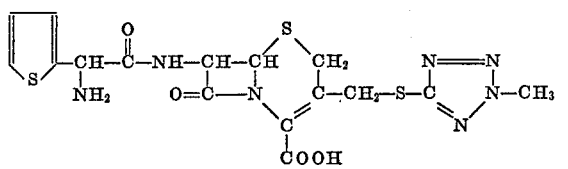

15. The sodium salt of the compound of claim 14.
16. The potassium salt of the compound of claim 14.
17. The zwitterion from of the compound of claim 14.
18. A nontoxic, pharmaceutically acceptable acid addition salt of the compound of claim 14.
19. The compound of claim 1 having the D configuration in the sidechain of the formula

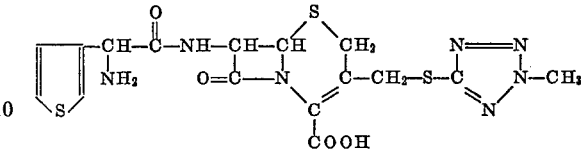

or a nontoxic, pharmaceutically acceptable salt thereof.
20. The compound of claim 2 having the D configuration in the sidechain of the formula

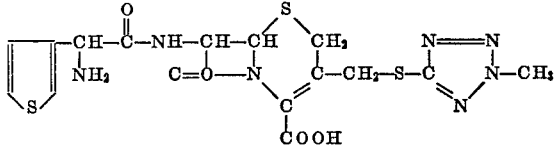

21. The sodium salt of the compound of claim 20.
22. The potassium salt of the compound of claim 20.
23. The zwitterion form of the compound of claim 20.
24. A nontoxic, pharmaceutically acceptable acid addition salt of the compound of claim 20.

References Cited
UNITED STATES PATENTS 3,641,021  2/1972  Ryan _____ 260—243 C NICHOLAS S. RIZZO, Primary Examiner U.S. Cl. X.R.

424—246